United States Patent [19]

Loevenich

[11] 4,184,226

[45] Jan. 22, 1980

[54] APPARATUS FOR DISCHARGING DRILLING DEBRIS, DRILLING DUST AND THE LIKE, MORE PARTICULARLY DURING THE DRILLING OPERATION IN THE CASE OF HAND DRILLING MACHINE

[76] Inventor: Norbert Loevenich, Kandinskystr. 27, D-8, Munich 71, Fed. Rep. of Germany

[21] Appl. No.: 763,015

[22] Filed: Jan. 27, 1977

[30] Foreign Application Priority Data

Jan. 29, 1976 [DE] Fed. Rep. of Germany ....... 2603330

[51] Int. Cl.² .............................................. A47L 9/02
[52] U.S. Cl. ................... 15/415 R; 15/339; 15/421; 408/67
[58] Field of Search ............... 15/339, 421, 415 R; 51/273; 90/11 R; 408/67; 144/252 R

[56] References Cited

U.S. PATENT DOCUMENTS

| 2,228,743 | 1/1941 | Belanger | 15/415 X |
| 2,349,156 | 5/1944 | Fischer | 15/339 X |
| 2,859,940 | 11/1958 | Brochetti | 15/339 X |
| 2,955,188 | 10/1960 | Campo | 15/339 X |

FOREIGN PATENT DOCUMENTS

| 2302167 | 9/1976 | France | 408/67 |
| 320479 | 2/1970 | Sweden | 15/339 |
| 1334366 | 10/1973 | United Kingdom | 408/67 |

*Primary Examiner*—Christopher K. Moore
*Attorney, Agent, or Firm*—Armstrong, Nikaido, Marmelstein & Kubovcik

[57] ABSTRACT

A device is provided for use with a hand drilling apparatus having a drill bit for discharging the debris formed by drilling into an object, said device comprising a chamber means positioned with respect to said drilling apparatus such that said chamber means is located over the borehole made by said drilling apparatus wherein said drill bit is movable within said chamber; a vacuum means for reducing the pressure in said chamber means; and a duct means for connecting said vacuum means to said chamber means, whereby the debris formed by the drilling collects in said chamber means and is withdrawn therefrom by said vacuum means through said duct means.

11 Claims, 16 Drawing Figures

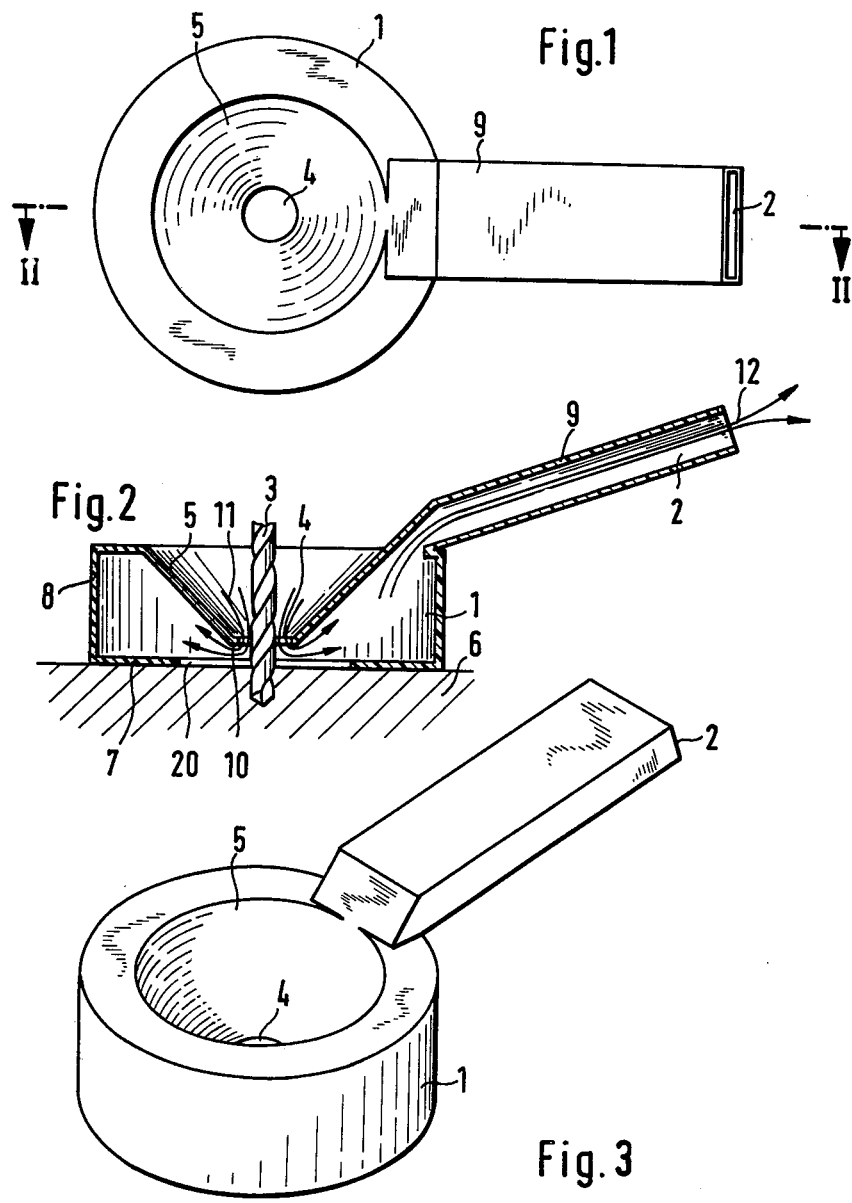

APPARATUS FOR DISCHARGING DRILLING DEBRIS, DRILLING DUST AND THE LIKE, MORE PARTICULARLY DURING THE DRILLING OPERATION IN THE CASE OF HAND DRILLING MACHINE

BACKGROUND OF THE INVENTION

1. Field of the Invention

The invention relates to apparatus for discharging drilling debris, drilling dust and the like, more particularly during the drilling operation in the case of hand drilling machines and by means of negative pressure with a chamber which is situated directly on the borehole and is open on the side nearest the borehole and a suction and delivery duct, connected to the chamber, the said duct being connected to a blower or the like which generates negative pressure.

2. Description of the Prior Art

Apparatus of this kind is known, more particularly in mining, to reduce the dust nuisance in the air of the working region. The known devices comprise comparatively heavy and complex apparatus. Another disadvantage of known systems is due to the fact that they are connected to the drilling machine or the drilling apparatus and furthermore in most cases are sealed with respect to the drill rod. Awkward exchanging of the seals is therefore necessary for each drill size. In addition, the seals are subject to substantial wear. There is also a disadvantage in known systems since their complex construction and the separate seals never allow the entire drill length to be utilized. The use or adaptation of such known devices to smaller machines or hand drilling machines was therefore never considered.

SUMMARY OF THE INVENTION

It is the object of the invention to provide apparatus of the kind described hereinabove which avoids all disadvantages of the prior art and furthermore, because of its convenience and simplicity, can be utilized for hand drilling machines or drilling machines of similar size.

In apparatus of the kind described hereinbefore this problem is solved substantially in that the chamber can be mounted on the surface surrounding the borehole independently of the drilling machine and by means of the negative pressure which is generated to discharge the drilling debris and that the drill rod is freely movable with respect to the chamber.

The invention more particularly achieves the advantage of not requiring any special drills or drilling machines to perform drilling operations without dust or drilling debris nuisance. Since the generated negative pressure enables the chamber to adhere to any surface, for example on the ceiling or wall of a building, and this can be achieved independently of the use of the drilling machine, it follows that handling of the apparatus according to the invention is much simpler and it is possible to drill overhead without difficulties. Furthermore, no special precautions are necessary when changing over to drill rods of different diameters since the drill rod is freely movable in the chamber and is inserted therein without any separate seal. The chamber can also be constructed in a distinctly simple and lightweight manner so that it can be attached as a source of negative pressure through a hose connection to a domestic vacuum cleaner, thus opening up a completely new range of application for dust extraction devices in the field of hand drilling machines. Due to the independent facilities for moving the drill rod withdrawal thereof from the borehole cleans the latter of all drilling debris, a feature which represents another advantage in the effect achieved, for example when drilling dowel holes. The apparatus according to the invention can moreover be used not only for drilling rock or concrete but also for drilling timber, plastics or even metal, a feature representing another advantage from the point of view of safety, more particularly as regards safety against injury through chips or drilling debris which has been thrown off.

A particularly advantageous further embodiment of the invention can be provided if the top of the chamber has an inlet aperture for the drill rod or drill in which said aperture the drill is freely movable with lateral clearance and that the flow cross-section which is defined by the inlet aperture for the ambient air drawn in is so dimensioned with respect to the flow cross-section in the suction and delivery duct as to ensure that the negative pressure maintained in the chamber is sufficient for the retention thereof. This embodiment according to the invention is regarded as particularly advantageous because it is only completely independent of the drilling machine or the drill and moreover is particularly easy to handle. When drilling with such a device the chamber can first be attached to the working surface by producing the necessary negative pressure with the blower and the drilling operation commences only subsequently.

One preferred embodiment according to the invention can be obtained by providing the top of the chamber with a funnel-shaped indentation, the inlet aperture being situated at the base of the indentation. Such a funnel-shaped indentation offers the advantage of enabling the drill to be applied at an angle to the working surface, even after the chamber has been attached. Furthermore, the funnel shape, which also surrounds the inlet aperture forming the suction port, gradually increases the velocity of the air and produces particularly advantageous flow conditions. Furthermore, practically the entire drill length can be utilized in drilling because the funnel shape allows the drill chuck to be advanced close to the working surface.

In an advantageous further development of this embodiment, the walls of the funnel-shaped indentation include an angle of 90°.

The invention can be further developed in detail in that the flow cross-section for the ambient air is defined or codefined by the distance from the funnel-shaped indentation edges which surround the inlet aperture. Accordingly, the inlet aperture can be made substantially larger to enable a wide range of drill sizes to be used without impairing the adhesion achieved by the negative pressure for the chamber on the working surface.

A tubular socket which reinforces the inlet aperture can be provided in a modified embodiment according to the invention. The tubular socket reinforces the edges of the inlet aperture which accommodates the drill because in practical use it is never possible to prevent a user contacting the said side edges with the drill which is already in rotation.

In particular, the chamber can be provided in accordance with the invention with a seal which seals the side walls of said chamber with respect to the working surface.

A particularly simple embodiment according to the invention can be obtained in that the seal, in the form of a flange connected to the chamber side walls, is constructed as a surface which bears on the working surface. Advantageously, the said flange can be constructed integrally with the side walls.

If the working surface is particularly rough or porous, a moulding of softer material can be provided in accordance with the invention and can be placed beneath the flange or edge to form an additional seal.

In a modified embodiment of the invention the flange can also be constructed separately of the side walls, but can be coupled thereto, in which case the flange advantageously consists of a flexible material such as rubber to provide a degree of hugging of the working surface.

One embodiment of the invention which is particularly advantageous as regards manufacturing costs and flexibility of use consists in the chamber being constructed in two parts with a cup-shaped bottom part and a lid part.

Advantageously, the lid part contains the inlet aperture and the suction and delivery duct.

The bottom part of this embodiment according to the invention can be interchangeable.

It is particularly advantageous in this case if the side of the bottom part which bears on the working surface is constructed in accordance with the shape thereof.

To this end, the bottom part can have two surfaces situated at a right angle to each other to permit drilling in internal or external edges.

The bottom part can be constructed in the form of a tetrahedron to facilitate drilling into three-dimensional corners, for example in the corner of a cube. A spherical or hollow spherical segmental shape or external cylinder surface section can also be considered for special fields of application.

Another embodiment of the invention is possible by providing an opening in the side walls for profile sections, more particularly curtain rails, which are to be mounted. This enables the decorator to drill directly, without generating dust, through a curtain rail which is to be mounted.

The suction and delivery duct in a particularly preferred embodiment according to the invention is constructed as a comparatively short socket.

The suction and delivery duct in this case can be connected to a vacuum cleaner, in which case the socket can have a coupling portion for the hose of a conventional domestic vacuum cleaner.

It is advantageous in this embodiment to connect the suction and delivery duct to the chamber by jointed means so that connection of the suction and delivery duct does not impair the suitability for use of the apparatus according to the invention on the ceiling, wall or other sloping or inclined surfaces.

It is of course also possible to connect the suction socket integrally with the chamber.

The embodiment according to the invention as described above is particularly preferred because it provides a universally usable apparatus which has numerous application facilities because of the above-mentioned advantages, more particularly in the household or for do-it-yourself workers.

To improve manipulation of the apparatus according to the invention still further, it is proposed to provide a controlled relief aperture in the suction and delivery duct. The adhesion produced by negative pressure need not therefore be forcibly interrupted by manual means when the apparatus is advanced from borehole but the negative pressure is merely relieved so that the apparatus can therefore be easily removed and reset.

The controlled relief aperture can have either a flap which can be manually operated or a spool which can be manually actuated. If the apparatus according to the invention is used for industrial purposes, it is also possible to provide a relief aperture which can be actuated and controlled by the drilling operation or by the conveying motion of the objects which are being processed.

Because of known properties of materials, it is particularly advantageous to construct all individual components of the invention as injection mouldings from plastics material. A transparent plastics material could be particularly advantageous because this facilitates visual inspection of the working area.

BRIEF DESCRIPTION OF THE DRAWINGS

Embodiments of the invention are explained hereinbelow and are illustrated in exemplified form in the accompanying drawings, in which:

FIG. 1 is a plan view of a first embodiment according to the invention;

FIG. 2 is a sectional view of FIG. 1;

FIG. 3 is a perspective view of the apparatus according to FIG. 1 or 2;

Identical reference numerals are used in the description of identical parts of all embodiments illustrated in the drawings.

DETAILED DESCRIPTION OF THE PREFERRED EMBODIMENTS

Figure 4:
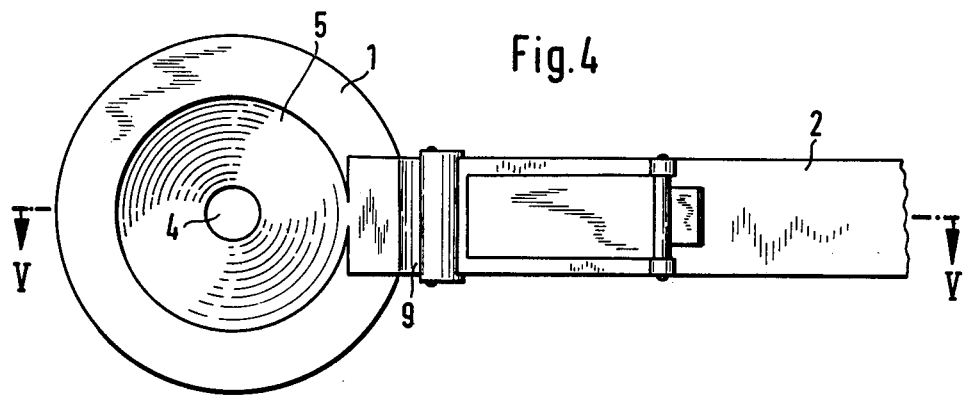
FIG. 4 is a modified embodiment according to the invention as a plan view.

The embodiment of the apparatus according to the invention as illustrated in FIGS. 1 to 3 is a particularly simple embodiment of the apparatus according to the invention and is intended more particularly for use with hand drilling machines in conjunction with domestic vacuum cleaners which function as blowers to produce negative pressure. The apparatus substantially comprises the chamber 1 in which negative pressure is generated by means of the blower or vacuum through the suction and delivery duct 2. The chamber 1 has an inlet aperture 4 for the insertion of the drill 3.

In the embodiment according to the invention as illustrated in FIGS. 1 to 3, the inlet aperture 4 is situated at the lowest point of a funnel-shaped indentation 5 which will be referred to subsequently. The numeral 6 refers to the working surface into which dust-free drilling is to be performed by means of the drill bit 3. The chamber 1 bears by means of an annular flange 7, constructed integrally with the bottom edge of the side walls 8 of the chamber 1, on the working surface 6. For most kinds of surface 6, the flange forms an adequate seal against the lateral inflow of ambient air into the chamber beneath the side walls 8 so that the negative pressure is maintained in the chamber.

For the sake of completeness it should be mentioned that the suction and delivery duct 2 is constructed as a tubular socket 9 which is integrally joined to the chamber and has a rectangular cross-section in the embodiment illustrated in FIGS. 1 to 3. The special cross-section of the tubular socket 9 is preferably selected either directly or through suitable adaptors so as to provide connecting facilities to the suction hose of a domestic or industrial vacuum cleaner.

Practical tests have shown that the negative pressure which can be produced by a simple vacuum cleaner in the chamber 1 is more than sufficient to ensure that the chamber 1 is reliably retained in every position on walls, on timber, on plastics or on metal, so that it is possible to drill horizontally, vertically or overhead. The decisive feature is that the flow cross-section defined by the inlet aperture 4 or by the distance of the bottom edge of the inlet aperture 4 is so dimensioned for the ambient air drawn in, as indicated by the arrows 11 in FIG. 2, with respect to the flow cross-section of the suction and delivery duct 2, that the negative pressure in the chamber 1 is always adequate for retaining the chamber on the working surface.

Operation with the apparatus according to FIGS. 1 and 2 is as follows: first, the chamber 1 with the inlet aperture 4 is held in the desired position and at the desired place on the working wall, after which the blower or vacuum cleaner is switched on. As a result of the negative pressure produced in the chamber 1, the chamber and its tubular socket 9 and the suction hose of the blower attached thereto is firmly drawn against the working surface 6. The drill 9 can then be advanced through the inlet aperture 4 to the working surface 6 and the hole can be drilled at the desired place. Any drilled materials such as drilling dust and drilling debris is continually extracted in the course of drilling, as indicated by the arrows 12 in FIG. 2. The drill 3 is withdrawn from the borehole after the hole has been drilled to a desired depth, the funnel-shaped indentation 5 permitting the drill chuck of the drill 3 to advance close to the working surface 6, as can be seen more particularly by reference to FIG. 2, i.e., the full length of the drill can be utilized. Owing to the fact that the blower remains switched on, the borehole is cleaned of the entire drilling debris simultaneously and automatically when the drill is withdrawn. The blower can then be switched off and the apparatus removed for resetting at the next working place.

As can also be seen by reference to the drawings, the dimensions of the inlet aperture 4 are large in relation to the drill 3 and no form of sealing with respect to the drill 3 is provided. The method of construction achieved thereby is particularly simple because the inlet aperture 4 also functions as the suction port for the ambient air which acts on the one hand as delivery medium and on the other hand as attachment medium. It can also be seen that a wide range of drill sizes can be used with one and the same apparatus without the latter having to be separately adapted because the inlet aperture 4 can always be chosen to be sufficiently large in that the free flow cross-section can be defined by the distance of the bottom edge 10 from the working surface 6 or the surface of the flange 7 which bears thereon.

FIGS. 4 to 7 and 8 show a modified embodiment according to the invention. In the embodiment illustrated in these Figures the tubular socket 9 which forms the suction and delivery duct 2 is provided with a joint 13 which can be of conventional construction, as can be seen more particularly by reference to FIG. 8. It will be evident to the expert that a flexible hose or a corresponding rotatable bend can be provided in place of such a joint. The joint 13 offers the advantage that when using the apparatus in the most diverse positions connection to the suction and delivery duct 2 does not produce a tilting movement which would have the tendency to detach the chamber 1 from the working surface 6. Furthermore, the suction and delivery duct does not occupy as much space during operation when using such a joint.

Figure 5:
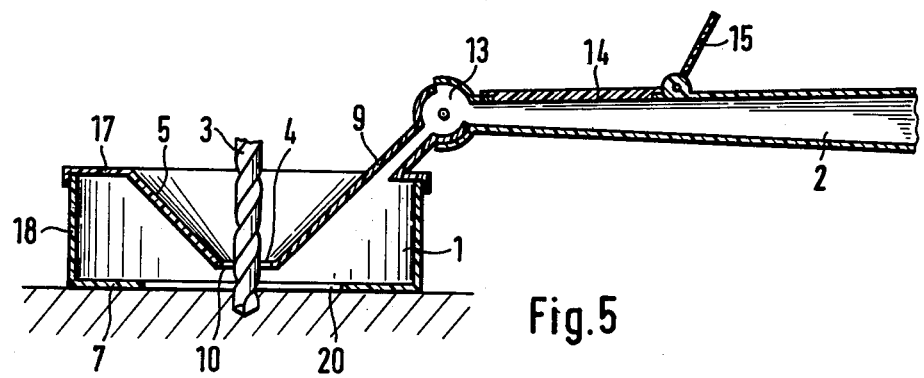
FIG. 5 is a sectional view of the embodiment according to FIG. 4.
Figure 6:
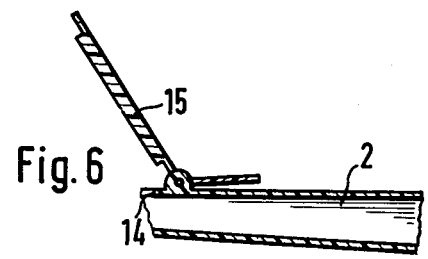
FIG. 6 shows the controlled relief aperture of the embodiment according to FIGS. 4 and 5 in an open position.
Figure 7:
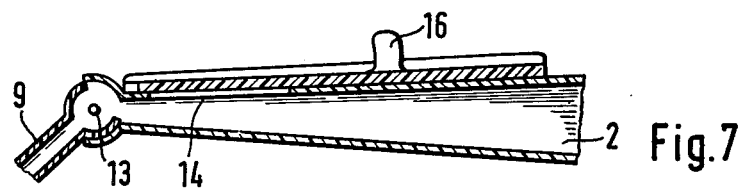
FIG. 7 shows another embodiment of the controlled relief aperture in the apparatus according to FIGS. 4 and 5.

As can also be seen by reference to FIGS. 4 to 8, this embodiment according to the invention provides for a controlled relief aperture 14 in the suction and delivery duct 2, control being effected either by means of a pivotable flap 15 (FIGS. 4 to 6 and 8) or by a spool 16 of conventional construction (FIG. 7). The controlled relief aperture 14 offers the advantage, particularly as several holes are to be drilled side by side, of briefly interrupting the negative pressure in the chamber 1 by opening the relief aperture 14 or at least by reducing such negative pressure so as to permit easy resetting of the chamber 1. It has been found in practical tests that even when using a simple domestic vacuum cleaner as a blower, it can be difficult in the case of a smooth base for the adhesion on the working surface 6 produced by negative pressure in the chamber to be manually overcome.

Figure 8:
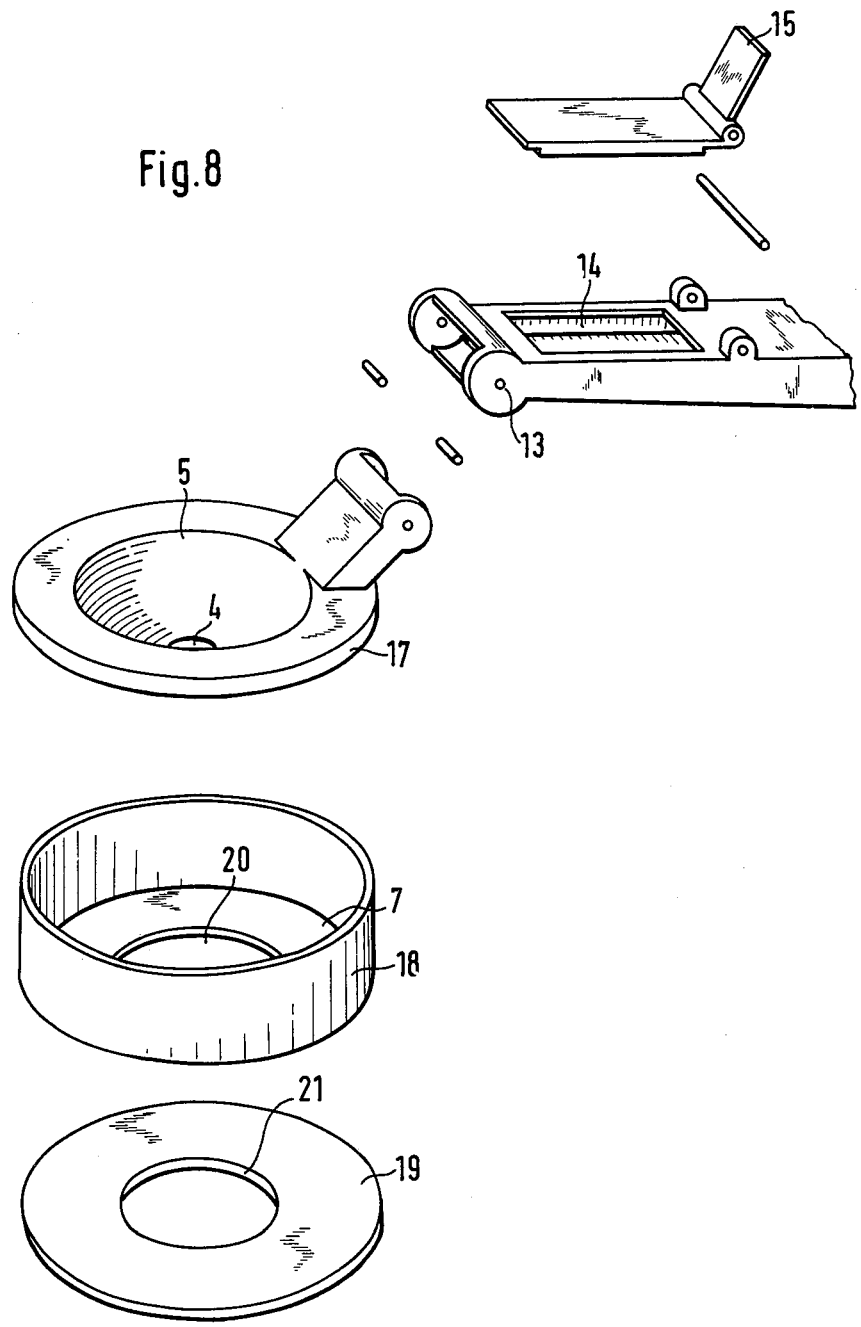
FIG. 8 shows the embodiment according to FIGS. 4 and 5 with the individual components in an exploded view.
Figure 9:
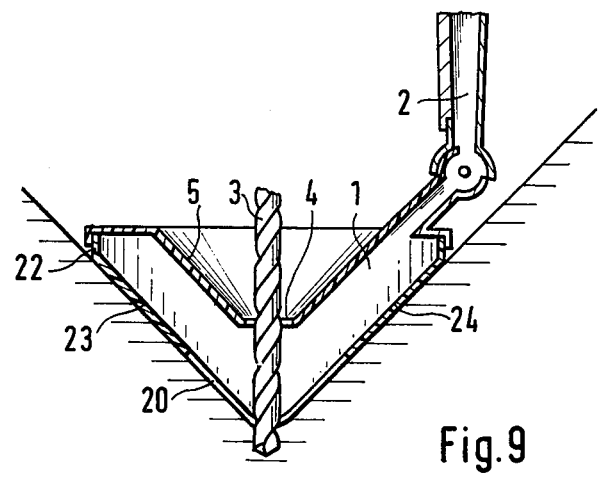
FIG. 9 shows the embodiment according to FIGS. 4 to 8 with another bottom part for drilling in corners.
Figure 10:
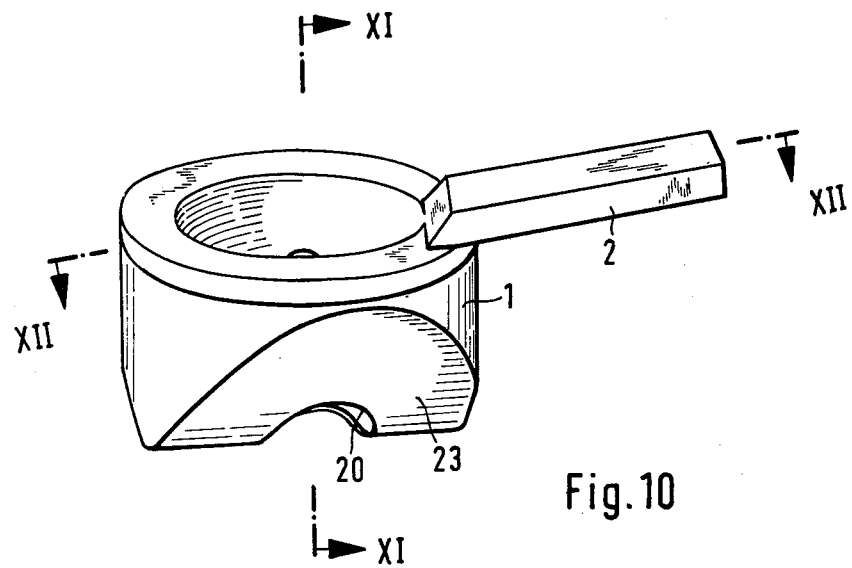
FIG. 10 is a perspective view according to FIG. 11.
Figure 11:
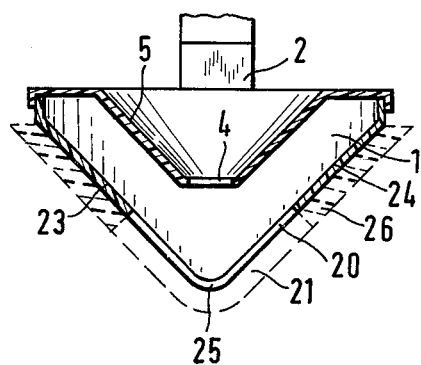
FIG. 11 is a sectional view along the line XI—XI according to FIG. 10.
Figure 12:
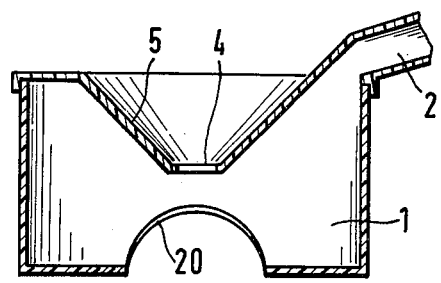
FIG. 12 is a sectional view along the line XII—XII of FIG. 10.

FIGS. 5 and 8 also show that the embodiment according to the invention illustrated in these drawings provides for a two-part chamber 1 comprising a lid part 17 and a bottom part 18. The lid part 17 contains the inlet aperture 4, the funnel-shaped indentation 5 and the tubular socket 9 and the bottom part 18 supports the flange 7 for sealing. The parts 17 and 18 are detachably joined to each other and owing to the fact that all details of the apparatus according to the invention can be constructed as injection mouldings from plastics material, it is possible for a screw connection or snap connection to be provided between these parts. Reference will again be made subsequently to the detachable connection between the bottom part 18 and the lid 19 by reference to FIGS. 9 to 12.

Details of the relief aperture 14 with the flap 15 and the joint 13 are disclosed in FIG. 8 which shows the apparatus according to FIGS. 4 to 6 in an exploded view. FIG. 8 also shows a moulding 19 the shape of which in the illustrated embodiment corresponds to the shape of the flange 6. If the working surface 6 is particularly rough, the moulding 19 can be placed beneath the flange 7 to provide better sealing. To this end, the moulding 19 advantageously comprises foam substance or the like and can have a fastening on the chamber 1. To achieve the same purpose, it is also possible to attach a flexible moulding directly on the side walls of the chamber 1 or of the bottom part 18 instead of the flange 7, to achieve a specific degree of hugging on the working surface 6. The aperture remaining in the annular flange in FIGS. 1 to 8 is designated with the number 20, the moulding 19 having a corresponding aperture 21.

Adaptation to the relevant shape of the working surface in the region of the borehole made possible by the two-part construction of the chamber 1 comprising a bottom part 18 and a lid part 17, is explained by reference to an exemplified embodiment which is illustrated in FIGS. 9 to 12 and can be employed for drilling directly in corners. In this embodiment, the lip part 17 is constructed identically to that of the embodiment according to FIGS. 4 to 8 and the bottom part of the embodiment according to FIGS. 4 to 8 was replaced by a bottom part 22, adapted to the shape of the working surface, a procedure which can be performed without difficulty because of the easy interchangeability of the bottom part. As shown, the bottom part 22 used for drilling in corners, has two contact surfaces 23, 24 situated at right angles to each ofther, which said surfaces perform the function of the flange 7 by bearing sealingly on walls which are situated perpendicularly to each other and form a corner. As regards further details, reference should be made to the drawings, special reference being made to the rounded bottom edge 25 in FIG. 11 and a correspondingly shaped moulding 26 which performs the same function as the moulding 19.

Figure 13:
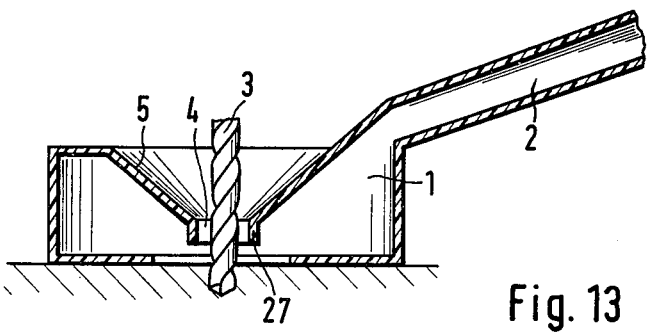
FIG. 13 is a modified embodiment according to the invention.

FIG. 13 shows in section one embodiment according to the invention in which the suction port 4 is reinforced by a tubular socket 27. The function of the tubular socket 27 is to reinforce the suction port 4 against damage by the drill 3.

Figure 14:
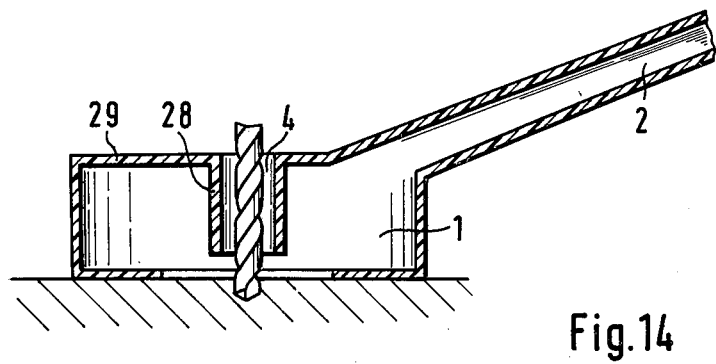
FIG. 14 is another modified embodiment according to the invention.

Another modified embodiment according to the invention is shown in sectional form in FIG. 14, in which the suction port 4 is formed by a tubular socket 28 which is integrally constructed with the top wall 29 of the chamber 1. According to FIG. 14, this embodiment has no funnel-shaped indentation 5.

Figure 15:
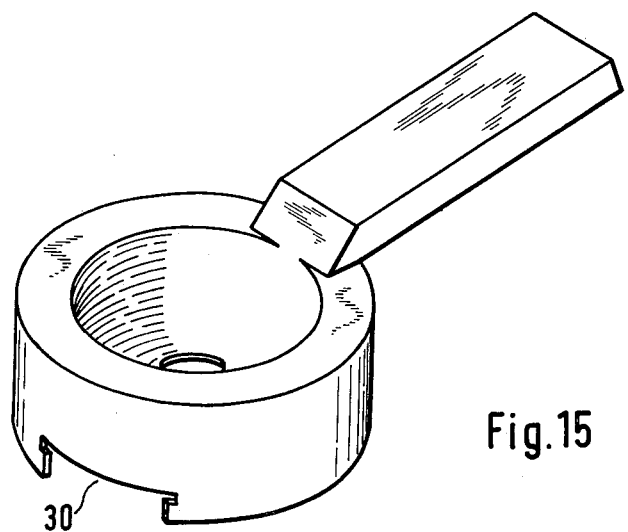
FIG. 15 shows the apparatus according to the invention in perspective view with a specially shaped profiled cut-out in the side wall.
Figure 16:
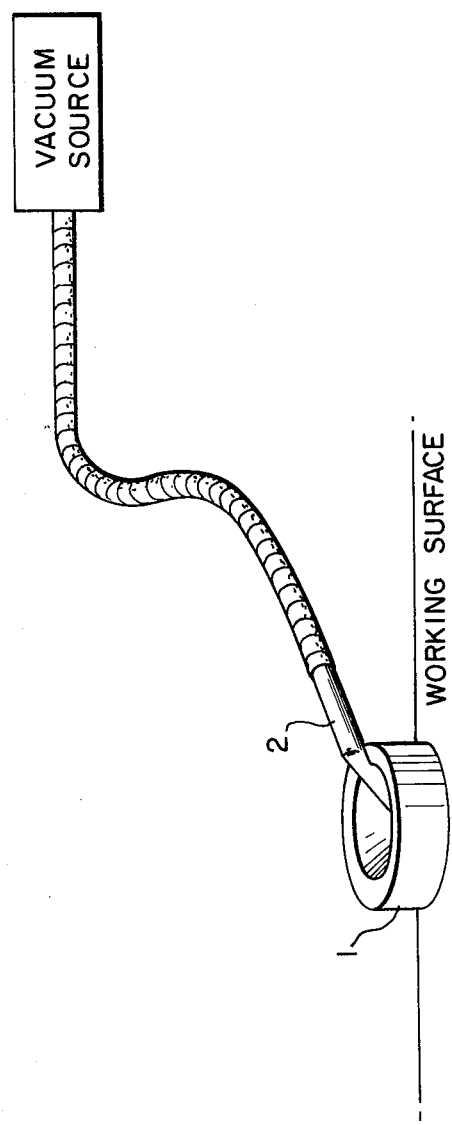
FIG. 16 shows the apparatus of the present invention connected to a vacuum source.

As an example of the versatility of the apparatus according to the invention, FIG. 15 also discloses an embodiment which is particularly suitable for decorators for the mounting of curtain rails. When mounting curtain rails on the ceiling, it is known to drill directly through the rail to avoid alignment faults. To enable the apparatus according to the invention to be used to this end, the side walls of the chamber 1 in the embodiment according to FIG. 15 are provided with a suitably shaped cut-out 30 which is adapted to accommodate the profile section of the curtain rail so that the apparatus can be slid along the curtain rail from working place to working place. Similar cut-outs can be constructed in accordance with the profile section which is to be processed in other modified embodiments according to the invention.

The apparatus according to the invention can be readily employed for industrial purposes in the rock, timber, plastics or metal processing industry and can improve reliability quite apart from simultaneously providing freedom from dust and chips at the working place. For assembly line work, it can be particularly advantageous if the apparatus according to the invention is installed so as to be pivotable together with the drilling machine so that corresponding controls can be provided for generating and interrupting the negative pressure.

Although the above description refers to special embodiments according to the invention, modifications and changes within the basic idea of the invention will be obvious to the expert. More particularly, the shape of the interchangeable bottom part 18 can be tetrahedal, spherical or hollow spherical segmental, or of cylinder surface, etc., as would correspond to the characteristics and shape of the appropriate surfaces. In many cases it can be advantageous to produce all parts of transparent plastics material if visual inspection of the working place is deemed to be desirable.

All technical details mentioned in the description and disclosed in the drawings are of significance for the invention.

I claim:

1. A device for use with a hand drilling apparatus having a drill bit for discharging the debris formed by drilling into an object, said device comprising:
    (a) an enclosed chamber means having upper wall means, lower wall means and side wall means therebetween, said upper, lower and side wall means defining said enclosed chamber means, said enclosed chamber means being free of physical contact with said drilling apparatus, thereby allowing said drill bit to move axially and laterally without moving said chamber means, said chamber means having a first aperture in the top wall means thereof and a second aperture in the bottom wall means thereof, said chamber means positioned with respect to said drilling apparatus such that the second aperture of said chamber means is located over a borehole made by said drilling apparatus in the surface of the object, said bottom wall means of said chamber means including a sealing portion surrounding said second aperture wherein said drill bit is movable axially and laterally within the first and second apertures of said chamber means;
    (b) vacuum means for reducing the pressure in said chamber means; and
    (c) duct means for connecting said vacuum means to said chamber means, wherein said area of said first aperture is such that the flow cross-section for the ambient air drawn in through said inlet aperture with respect to the flow cross-section of said duct means is such that a negative pressure is maintained in said chamber means such that said sealing portion of said bottom wall means is sealed against the surface of said object and is held against the surface of said object surrounding the borehole by the negative pressure in cooperation with said sealing means and whereby the debris formed by the drilling collects in said chamber means and is withdrawn therefrom by said vacuum means through said duct means.

2. Apparatus according to claim 1, wherein the top of said chamber means has a funnel-shaped indentation, said inlet aperture being positioned at the bottom of said indentation.

3. Apparatus according to claim 2, wherein the walls of said funnel-shaped indentation enclose an angle of 90°.

4. Apparatus according to claim 2, wherein the flow cross-section for the ambient air is defined by the opening at the apex end of said funnel-shaped indentation.

5. Apparatus according to claim 1, including a tubular socket for reinforcing the inlet aperture.

6. Apparatus according to claim 1, wherein said sealing portion includes a flange bearing surface connected to the side walls of said chamber means.

7. Apparatus according to claim 6, wherein said flange is integral with the side walls of said chamber means.

8. Apparatus according to claim 1, wherein said duct means includes a socket.

9. Apparatus according to claim 8, wherein said vacuum means comprises a vacuum cleaner.

10. Apparatus according to claim 9, wherein said socket is connected to a coupling portion for the hose of said vacuum cleaner.

11. Apparatus according to claim 1, wherein said duct means is integrally connected to said chamber means.

* * * * *